(12) United States Patent
Bilger

(10) Patent No.: US 7,981,185 B2
(45) Date of Patent: Jul. 19, 2011

(54) FILTER INSTALLATION DEVICE

(75) Inventor: Theo Bilger, Helfrantzkirch (FR)

(73) Assignee: Ateliers Busch SA, Chevenez (CH)

( * ) Notice: Subject to any disclaimer, the term of this patent is extended or adjusted under 35 U.S.C. 154(b) by 266 days.

(21) Appl. No.: 12/312,720

(22) PCT Filed: Nov. 27, 2006

(86) PCT No.: PCT/EP2006/068944
§ 371 (c)(1),
(2), (4) Date: May 22, 2009

(87) PCT Pub. No.: WO2008/064713
PCT Pub. Date: Jun. 5, 2008

(65) Prior Publication Data
US 2010/0050877 A1 Mar. 4, 2010

(51) Int. Cl.
*B01D 50/00* (2006.01)
(52) U.S. Cl. ............... 55/498; 55/320; 55/327; 55/462; 55/502; 96/187
(58) Field of Classification Search .............. 55/320, 55/327, 498, 462, 502; 96/187
See application file for complete search history.

(56) References Cited

U.S. PATENT DOCUMENTS
6,350,299 B1 2/2002 Dekker et al.
2004/0184941 A1 9/2004 Aoki et al.

FOREIGN PATENT DOCUMENTS
DE 34 45 400 A1 6/1986

*Primary Examiner* — Jason M Greene
*Assistant Examiner* — Dung Bui
(74) *Attorney, Agent, or Firm* — Oliff & Berridge, PLC

(57) ABSTRACT

Device for extracting droplets of a liquid agent suspended in a gaseous fluid displaced in a machine for displacement of such a gaseous fluid, the extraction device comprising a first part and a second part. The first part comprising a first element, which is of elongated shape, with a longitudinal axis termed the first axis, and is intended to ensure a filtration function inside the apparatus; and a second element, which is intended to enable at least one of the following functions, which are a function of grasping at least by hand the first part and a function of fixing this first part to the second part. The second part comprising a wall that defines a chamber which is intended to be traversed by the gaseous fluid to be filtered and receives said first element in a position termed the operational position; and comprises an opening that delimits a passageway sufficient for the insertion of the first element into the chamber.

6 Claims, 4 Drawing Sheets

FILTER INSTALLATION DEVICE

The invention relates to a device for extracting droplets of a liquid agent suspended in a gaseous fluid displaced in a machine for displacement of such a gaseous fluid.

The invention likewise relates to a machine equipped with the aforementioned extraction device.

The invention applies more specifically, but not exclusively, to an extraction device for a vacuum pump implementing a rotor equipped with blades.

In a general way, a machine for displacement of gaseous fluid conventionally comprises a device for displacement of gaseous fluid implementing at least one movable piece, the functioning of which requires use of a liquid agent, such as a liquid agent which, having as functions to ensure the lubrication and the tightness of the movable piece, takes the form of droplets in suspension in the gaseous fluid expelled from the device.

Upon its expulsion from the displacement device, the gaseous fluid carries with it droplets of liquid agent, and the expelled gaseous fluid cannot be used, or discharged into the atmosphere, or in the environment of the pump, without prior treatment with a view to extracting the liquid agent.

To this end, the gaseous fluid expelled from the displacement device is led into a device having a function of extraction of the droplets of liquid agent which are suspended in the gaseous fluid.

Despite long decades of study and development in slide vane rotary vacuum pumps, specialists are still searching today for permanent solutions for achieving such pumps which, while having reduced structural dimensions compared with known pumps, have enhanced performance and reliability, but a cost of manufacture that is however lower.

This compromise is very difficult to reach, and when it can be reached, it is only through use of extraction devices of a known type for a pump where the good functioning of the assembly and compliance with standards, such as pollution standards, can be ensured.

Certain parts of the extraction devices have a very limited service life compared to the life of the pump, and these parts of the extraction devices must be replaced periodically with new parts.

The replacement must be simple and quick, and the user of the pump or the person responsible for maintenance must not have the possibility of making a mistake by using a new part of the extraction device which is not appropriate, i.e. is not intended for that purpose, in another part of the extraction device.

One result which the invention aims to obtain is precisely an extraction device which does not permit this type of error.

Figure 1:
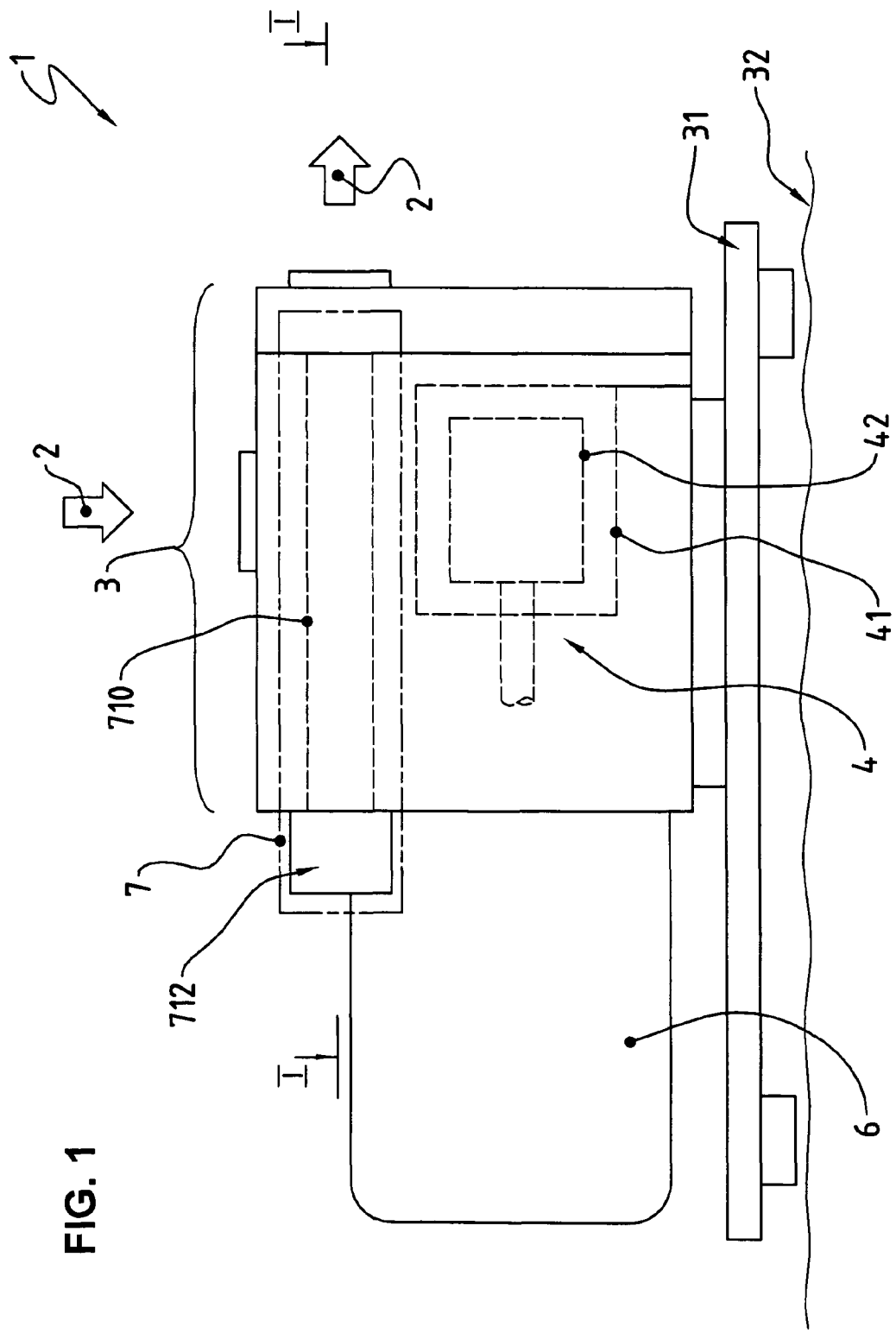
Figure 2:
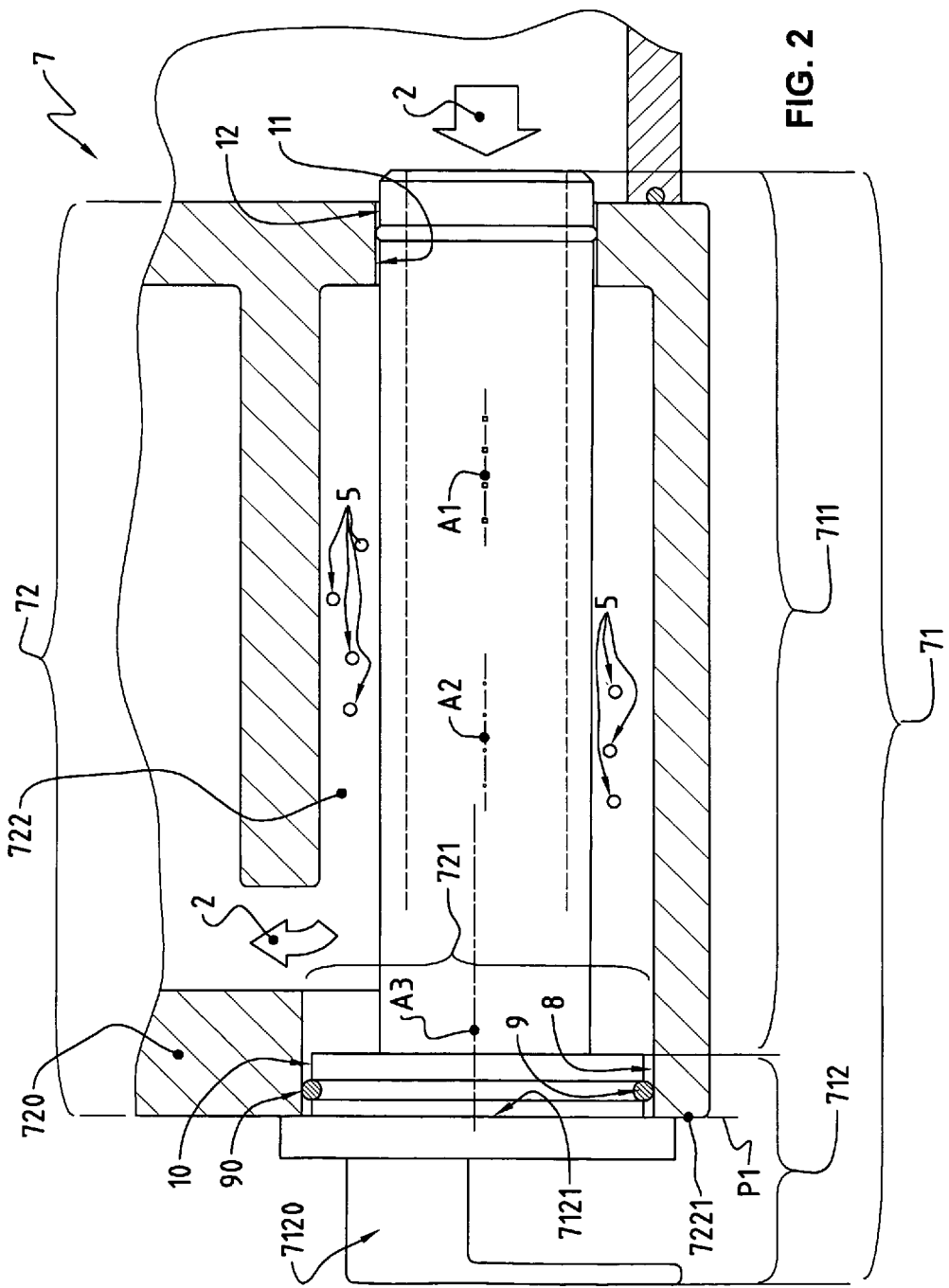
Figure 3:
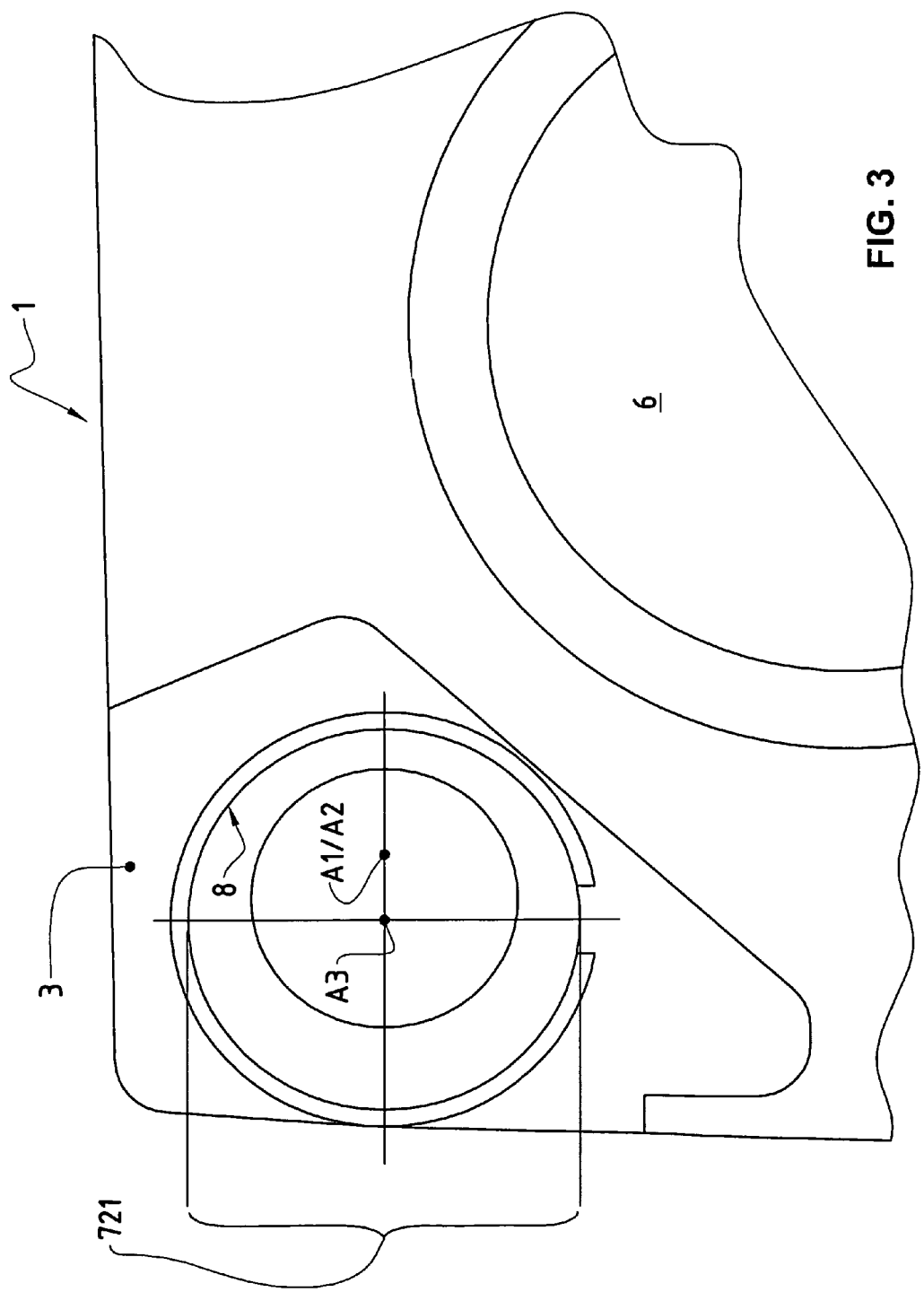
Figure 4:
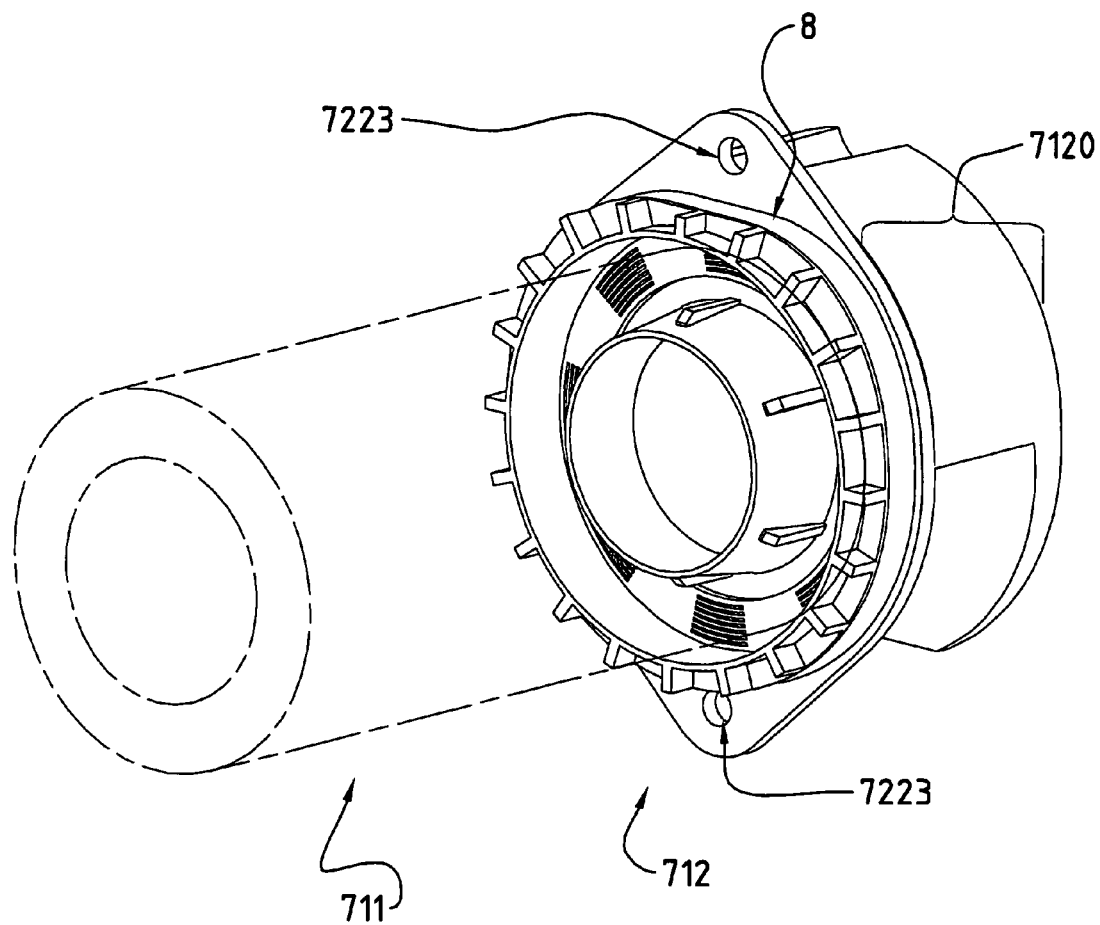

The invention will be better understood from reading the description which follows, given by way of non-limiting example, with reference to the attached drawing representing schematically:

FIG. 1: a side face view of a machine equipped with the extraction device according to the invention, FIG. 2: a view in longitudinal section of an extraction device according to the invention along I-I of FIG. 1, FIG. 3: a partial view along F of the machine of FIG. 1;

FIG. 4: a view in perspective of a part of the extraction device.

Referring to the drawing, one sees a machine 1 for displacement of gaseous fluid 2.

The machine 1 comprises a structure 3, which, preferably, is equipped with a support pedestal 31 on a support 32, for example a horizontal support.

The gaseous fluid 2 is symbolized by a plurality of arrow marks 2.

The machine 1 is placed in a circuit of gaseous fluid 2 which has not been represented.

The machine 1 withdraws the gaseous fluid in a portion of the circuit and expels it in another.

The machine for displacement of gaseous fluid 2 conventionally comprises an apparatus 4 for displacement of gaseous fluid implementing at least one movable piece 42, the functioning of which requires use of a liquid agent 5, such as a liquid agent 5 which, having as functions to ensure the lubrication and the tightness of the movable piece 42, takes the form of droplets in suspension in the gaseous fluid 2 expelled from the apparatus 4.

The apparatus 4 comprises, for example, a cylinder 40 with a bore 41 that accommodates a movable piece 42 consisting of a rotor, lubricated and made tight with a liquid agent 5, and connected to a motor 6.

Upon its expulsion from the displacement apparatus 4, the gaseous fluid 2 carries with it droplets of liquid agent 5, and the gaseous fluid 2 expelled cannot be used, or discharged into the atmosphere, or into the environment of the machine 1, without prior treatment with a view to extraction of the liquid agent 5.

The values for the discharge are imposed in particular by the laws relating to standards.

To this end, the gaseous fluid 2 expelled from the displacement apparatus 4 is led into at least one device 7, termed extraction device, and having a function of extraction of droplets of liquid agent 5 which are suspended in the gaseous fluid 2.

The liquid agent 5 has been represented by circle marks 5.

These circles symbolize droplets (not represented) united in drops which flow toward a recovery reservoir (not represented).

The extraction device 7 comprises essentially a first part 71 and a second part 72, the first part 71 comprising
a first element 711 which, of elongated shape, with a longitudinal axis termed the first axis A1, is intended to ensure a filtration function inside the apparatus 4; and
a second element 712, which is intended to enable at least one of the following functions, which are a function of grasping at least by hand the first part 71 and a function of fixing this first part 71 to the second part 72, the second part 72 comprising a wall 720 that
defines a chamber 722 which is intended to be traversed by the gaseous fluid 2 to be filtered and receives said first element 711 in a position termed the operational position P1; and
comprises an opening 721 that delimits a passageway sufficient for the insertion of the first element 711 into the chamber 722.

The term "function of grasping" means that the second element 712 can be grasped and held, for example manually, in order to enable manipulation of the extraction device 7.

The first part 71 and the second part 72 have reciprocal supporting surfaces for at least ensuring, in operational position P1 of the first element 711, the alignment of the first axis A1 of the first element 711 with another axis, termed second axis A2, defined by the second part 72, and this in order to:

ensure an advance of the gaseous fluid 2 through the first element 711 when this first element 711 is held in the operational position P1, to oppose the escape of gaseous fluid 2 toward the outside of the extraction device 7, to enable one of the operations which are, on the one hand, the engagement in translation of the first element 711 in the chamber 722 through the aperture 721 and along said second axis A2, and this up to the position termed operational position P1, and, on the other hand, the disengagement in translation of said first element 711 with a view to its complete extraction from the chamber 722.

The first element 711 of the first part 71 of the extraction device 7 has, for example, a cylindrically elongated shape on which two opposite ends can be distinguished, which are a first end at which the second element 712 is found mounted and another end which is free.

During assembly, it is the free end of the first element 711 which is inserted through the aperture 721 and is pushed into the chamber 722 of the second part 72 of the extraction device 7.

Preferably, the extraction device 7 comprises a third supporting surface 11 and a fourth supporting surface 12 which co-operate to at least help in defining the second axis A2.

The third supporting surface 11 is situated at the free end of the first part 711 of the first element 71, and the fourth supporting surface 12 is situated, facing, in the wall 720.

In the known extraction devices 7, all the supporting surfaces (first to fourth) are rotationally cylindrical, and the mounting axes (second and third) according to the definition of which they participate two by two, are all aligned, which makes the first parts 71 of these extraction devices 7 very easily interchangeable, with the risks of non-appropriate use that result.

In a noteworthy way, in order to prevent first parts 71 not appropriate for an extraction device 7 from being able to be used:

the aperture 721 provided to allow passage for the first element 711 of the first part 71 defines at least one of the supporting surfaces, and this supporting surface, termed first supporting surface 8, is intended to co-operate by way of a seal or gasket 9, with another supporting surface, termed second supporting surface 10, situated on the second element 712 of the first part 71 of the extraction device 7, said first supporting surface 8 and second supporting surface 10 have complementary shapes so as to fit together by translation along a third axis A3, which is substantially parallel to the second axis A2, when the first part 71 is brought into operational position P1, at least one of the parameters, which are on the one hand, the complementary shapes of the first supporting surface 8 and of the second supporting surface 10, and on the other hand, a difference in position of the second axis A2 with respect to the third axis A3, is such that it impedes the rotation of the second supporting surface 10 in the first supporting surface 8.

Preventing the rotation of the second supporting surface 10 in the first supporting surface 8 is not the end goal as such, but the fact that the rotation is prevented makes it possible to ensure the achievement of the result sought, i.e. that the second part of the extraction device 7 is not able to receive a first part 71, which is not actually intended for it.

The second axis A2 and the third axis A3 can be merged.

In another way, the second axis A2 and the third axis A3 can be merged and aligned substantially on the first axis A1.

Likewise, the second axis A2 and the third axis A3 can be merged and aligned substantially on the first axis A1.

The operational position P1 is defined, for example, by two opposing surfaces of which, the one, termed first surface 7121 and situated on the first part 71, and the other, termed second surface 7221 and situated on the second part 72, come into contact when the translation of the first part 71 of the extraction device 7 in the chamber 722 must be stopped because the operational position P1 is reached.

The first surface 7121 and the second surface 7221 are preferably surfaces which extend in planes substantially orthogonal to the second axis A2.

If a first part 71 not appropriate for a second part 72 is used, an escape of gaseous fluid 2 occurs, and this impedes the normal functioning of the extraction device 7 and/or of the apparatus 4 or at least interferes with it to the point where an operator must remedy this drawback by using an appropriate first part 71 if he wishes to obtain correct functioning.

According to a first noteworthy embodiment:

the first supporting surface 8 and the second supporting surface 10 each have a substantially rotationally cylindrical shape, the dimensions of which are adjusted to allow their fit through relative translation along the third axis A3, and the third axis A3 is spaced apart from the second axis A2 by a predetermined value, to impede the relative rotation of said first supporting surface 8 and second supporting surface 10 along the third axis A3.

It is not possible to indicate exactly a precise value or value range for the value of the offsetting because it depends in particular on the play in the assembly which exists between the first supporting surface 8 and the second supporting surface 10.

It is one skilled in the art who selects this sufficiently large value to prevent the mounting of a first part 71 and a second part 72 which are not appropriate.

Meant by cylindrical shape is a shape defined by a plurality of generatrices which extend parallel to a longitudinal axis.

When the cylindrical shape is rotational, the generatrices are parallel and equidistant from the longitudinal axis.

According to a second embodiment:

the first supporting surface 8 and the second supporting surface 10 each have a cylindrical shape which is akin to a rotationally cylindrical shape, but which is not rotationally cylindrical, and these two supporting surfaces have dimensions which are adjusted to allow their fit through relative translation along the third axis A3, the cylindrical shape has an asymmetry at least sufficient to impede the relative rotation of said first supporting surface 8 and second supporting surface 10 along the third axis A3.

Understood by the expression "akin to a rotationally cylindrical shape, but which is not rotationally cylindrical" must be, for example:

a cylindrical shape which, seen in cross section, appears inscribed in two semi-circular arcs which, of substantially different diameters, connect without notable angle, and by curved lines, for example, a cylindrical shape which, seen in cross section, appears inscribed in two arcs, one being semi-circular and another ellipsoid, which connect without notable angle and by curved lines, for example.

Conforming to a third embodiment:

the first supporting surface 8 and the second supporting surface 10 each have a cylindrical shape which is akin to a rotationally cylindrical shape, but which is not rotationally cylindrical, and these two supporting surfaces have dimensions which are adjusted to allow their fit through relative translation along the third axis A3, the cylindrical shape has an asymmetry at least sufficient to impede the relative rotation of said first supporting surface 8 and second supporting surface 10, the third axis A3 is separated from the second axis A2 by a predetermined value, likewise to prevent the relative rotation of said first supporting surface 8 and second supporting surface 10 along the third axis A3.

The technical features of the three embodiments just presented also make it possible to discourage an intentional attempt to copy first parts 71 of extraction devices 7 in the sense that they appear:

to include a second rotationally cylindrical supporting surface 10 without the latter being so, and/or to include a second supporting surface 10 perfectly aligned with the longitudinal axis of the first element 711 without the latter being so.

This could lead infringers to make mistakes.

The seal or gasket 9 is accommodated in a groove made peripherally in the second supporting surface 10 situated on the second element 712 of the first part 71.

One skilled in the art knows how to determine the dimensions of said first supporting surface 8 and second supporting surface 10 so as to ensure the function of tightness of the annular seal or gasket 9.

These dimensions are functions of characteristics and dimensions of the annular seal or gasket 9, which are generally indicated by the manufacturer of any seal or gasket of annular type.

Functioning of the invention is possible because the seal or gaskets of annular type, such as toric joints or O rings, enable an elastic interface to be achieved between two surfaces which are not perfectly rotationally circular.

The technical features of any one of the embodiments make impossible use of a first part 71 of extraction device 7 which does not fit the aforementioned definition for at least one of the following reasons:

said first part 71 cannot be brought into operational position P1, said first part 71 can be brought into operational position P1, but no tightness can be achieved between the first supporting surface 8 and the second supporting surface 10.

As was stated further above, the second element 712 is intended to enable from the outside of the device 1 a function of gripping, at least manually, of the assembly constituted by said first element 711 and second element 712.

To allow this function of gripping and also a function of traction on the first part 71, the second element 712 bears a handle 7120.

As concerns the function of fixation, it can be ensured by means of fixing elements (not shown), such as screws which pass through drilled holes 7223 provided in the second part 712 of the first element 71 and find anchorage in the second part 72.

In a noteworthy way, the wall 720 which defines the chamber 722 intended to accommodate the first element 711 of the first part 71 is made up of a wall 720 of the structure 3 of a machine 4 intended to be equipped with this extraction apparatus 4.

In a noteworthy way, the machine 1 for displacement of gaseous fluid 2 comprises the extraction device 7 which has just been described.

The invention claimed is:

1. Device for extracting droplets of a liquid agent suspended in a gaseous fluid displaced in a machine for displacement of such a gaseous fluid, the extraction device comprising a first part and a second part, the first part comprising:

an elongated first element having a longitudinal first axis, the first element being intended to ensure a filtration function inside the apparatus; and a second element intended to enable at least one of a function of grasping at least by hand the first part and a function of fixing the first part to the second part, the second part defining a second axis and comprising a wall that defines a chamber intended to be traversed by the gaseous fluid to be filtered and receives said first element in an operational position; and comprises an opening that delimits a passageway sufficient for the insertion of the first element into the chamber, the first part and the second part further including reciprocal supporting surfaces for at least ensuring, in the operational position of the first element, alignment of the first axis of the first element with the second axis defined by the second part, to ensure functioning of the extraction device, wherein an aperture provided to allow passage for the first element of the first part defines a first supporting surface of the supporting surfaces, intended to co-operate by way of a seal or gasket, with a second supporting surface of the supporting surfaces situated on the second element of the first part of the extraction device, the first supporting surface and the second supporting surface have complementary shapes so as to fit together by translation along a third axis substantially parallel to the second axis, when the first part is brought into the operational position, and rotation of the second supporting surface in the first supporting surface is impeded by at least one of (1) the complementary shapes of the first supporting surface and of the second supporting surface and (2) a difference in position of the second axis with respect to the third, axis.

2. Device according to claim 1, wherein:

the first supporting surface and the second supporting surface each have a substantially rotationally cylindrical shape, the dimensions of which are adjusted to allow their fit through relative translation along the third axis, and the third axis is spaced apart from the second axis by a predetermined value, to impede the relative rotation of the first supporting surface and the second supporting surface along the third axis.

3. Device according to claim 1, wherein:

the first supporting surface and the second supporting surface each have a cylindrical shape, and the first and second supporting surfaces having dimensions adjusted to allow their fit through relative translation along the third axis, and the cylindrical shape has an asymmetry at least sufficient to impede the relative rotation of the first supporting surface and the second supporting surface along the third axis.

4. Device according to claim 1, wherein:

the first supporting surface and the second supporting surface each have a cylindrical shape, and the first and second supporting surfaces having dimensions adjusted to allow their fit through relative translation along the third axis, the cylindrical shape has an asymmetry at least sufficient to impede the relative rotation of the first supporting surface and the second supporting surface, and the third axis is separated from the second axis by a predetermined value, likewise to impede the relative rotation of the first supporting surface and the second supporting surface along the third axis.

5. Device according to claim 1, wherein the wall that defines the chamber intended to accommodate the first element of the first part includes a structural wall of a machine intended to be equipped with the extraction device.

6. Machine for displacement of a gaseous fluid comprising a device according to claim 1.

* * * * *